United States Patent [19]

Mochida

[11] Patent Number: 4,473,141

[45] Date of Patent: Sep. 25, 1984

[54] SHIFT LEVER AND PARKING BRAKE CONTROL

[75] Inventor: Haruo Mochida, Yokohama, Japan

[73] Assignee: Nissan Motor Company, Limited, Yokohama, Japan

[21] Appl. No.: 343,551

[22] Filed: Jan. 28, 1982

[30] Foreign Application Priority Data

Mar. 10, 1981 [JP] Japan ............................ 56-33732[U]

[51] Int. Cl.³ ............................................. B60K 41/28
[52] U.S. Cl. .......................................... 192/1; 74/850;
74/538; 74/475; 200/61.88; 340/52 D; 192/4 A; 192/30 W
[58] Field of Search ............... 192/1, 4 A, 4 C, 30 W, 192/9; 74/850, 538, 475; 200/61.88; 340/52 D

[56] References Cited

U.S. PATENT DOCUMENTS 3,110,355 11/1963 Tranbarger et al. ............... 192/4 A
3,119,477 1/1964 Ryder ................................ 192/4 A
3,912,050 10/1975 Iwanaga et al. ................... 192/4 A

FOREIGN PATENT DOCUMENTS 22623 2/1979 Japan ................................ 192/4 A

*Primary Examiner*—George H. Krizmanich
*Assistant Examiner*—M. Manley
*Attorney, Agent, or Firm*—Lane, Aitken & Kananen

[57] ABSTRACT

A shift lever control device for an automotive transmission by which a shift lever can be shifted from a Park position to a Reverse position or vice versa only when the park brake is in opertion and the engine has been started. The control device comprises a shift lever control means having a plunger and an electromagnetic actuation mechanism, an ignition key switch and a park brake switch, in addition to a conventional shift lever device having a shift lever, a position plate, a pin, and so forth. The ignition key switch, the park brake switch, and the electromagnetic mechanism are connected in series between a power supply and ground, so that if the park brake is released or the engine turned off, the electromagnetic mechanism is operated to actuate the plunger to drive the pin of the gear shift level into engagement with a Park position slot. The control device is also intended to prevent the dangerous situation when the shift lever is accidentally set to the park position while the engine is running.

6 Claims, 8 Drawing Figures

FIG.1
PRIOR ART
FIG.2
PRIOR ART
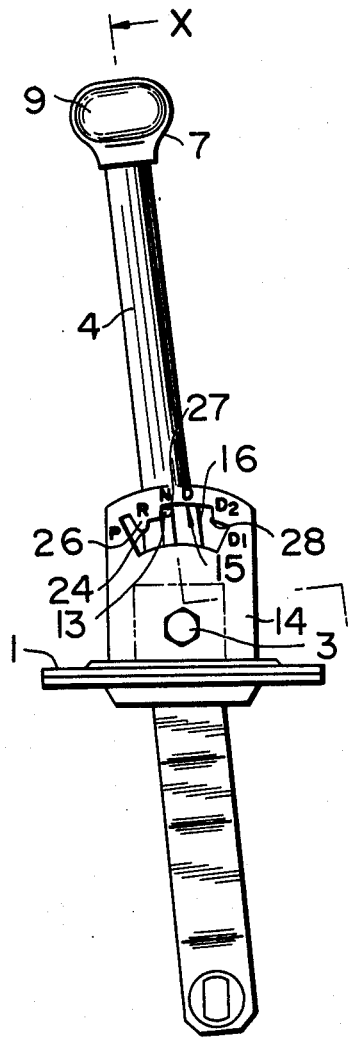
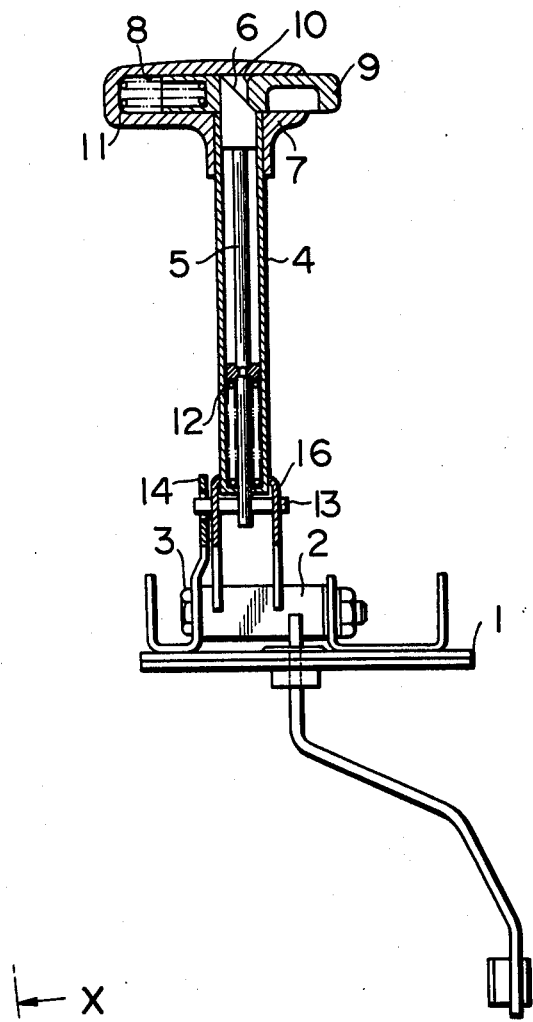

SHIFT LEVER AND PARKING BRAKE CONTROL

BACKGROUND OF THE INVENTION

1. Field of the Invention

The present invention relates generally to a shift lever control device for an automatic transmission, and more specifically to a shift lever control device by which a park position can be selected only when a park brake is securely applied to the automotive vehicle while the engine is running.

2. Description of the Prior Art

In an automotive vehicle provided with an automatic transmission, when a gear shift lever is shifted into any position of Park (P), Reverse (R), Neutral (N), Drive (D), Second (2), or First (1), the position of transmission gears is changed to drive or park the vehicle under an appropriate gear ratio. Therefore, in order to park the vehicle safely, it is necessary for the driver to leave the vehicle after he confirms that the gear shift lever has been securely shifted into the park position (P). If the driver leaves the vehicle with the gear shift lever shifted in any position other than the park position (P) while the engine is running, the vehicle will operate more dangerously, especially in the case where the shift lever is shifted into a Reverse position.

In order to securely park the vehicle, conventionally there is provided a projection between a park position and a reverse position. In a prior-art gear shift lever device, however, since there inevitably exists a pseudo-park or a pseudo-reverse position on top of the projection, when shifting the shift lever into the park position, the driver often mistakes the pseudo-park position for the true park position. In case the driver gets out of the vehicle with the shift lever shifted into this pseudo-position relative to the projection and closes the door, the resulting shock may accidentally cause a shift to the shift lever from the pseudo-park position to the reverse position, with the result that the vehicle begins to move dangerously rearward against driver's will.

In order to securely shift the shift lever into the park position, that is, in order to reduce the angle of range of the pseudo-park position, it is possible to use a strong detent mechanism; however, when the shifting force is increased for further reliable positioning of the shift lever, the gear shift lever becomes more difficult to operate; in other words, it is impossible to completely eliminate the deviation angle range of a pseudo-park position.

A more detailed description of the prior-art shift lever device for an automatic transmission will be made hereinafter under DETAILED DESCRIPTION OF THE PREFERRED EMBODIMENTS with reference to the attached drawing.

SUMMARY OF THE INVENTION

With these problems in mind therefore, it is the primary object of the present invention to provide a shift lever control device for an automatic transmission by which a shift lever control means is additionally provided in order to permit the shift lever to be shifted from the reverse position to the park position or vice versa only while a park brake is operative after the engine has been started in order to prevent the shift lever from being shifted from the reverse position to the park position while the park brake is inoperative.

To achieve the above-mentioned object, the shift lever control device according to the present invention comprises a shift lever control means including a plunger and a electromagnetic mechanism, an ignition switch and a park brake switch, in addition to a conventional shift lever device having a shift lever, a position plate, a pin, and so forth. Additionally, it is also possible to provide an alarm device for the shift lever control device described above.

BRIEF DESCRIPTION OF THE DRAWINGS

The features and advantages of the shift lever control device for an automatic transmission according to the present invention will be more clearly appreciated from the following description taken in conjunction with the accompanying drawings in which like reference numerals designate corresponding elements and in which:

FIG. 1 is a side view of a representative prior-art gear shift lever;

FIG. 2 is a front longitudinal-section view of the representative prior-art gear shift lever, taken along the lines X—X in FIG. 1;

DETAILED DESCRIPTION OF THE PREFERRED EMBODIMENTS

Figure 3:
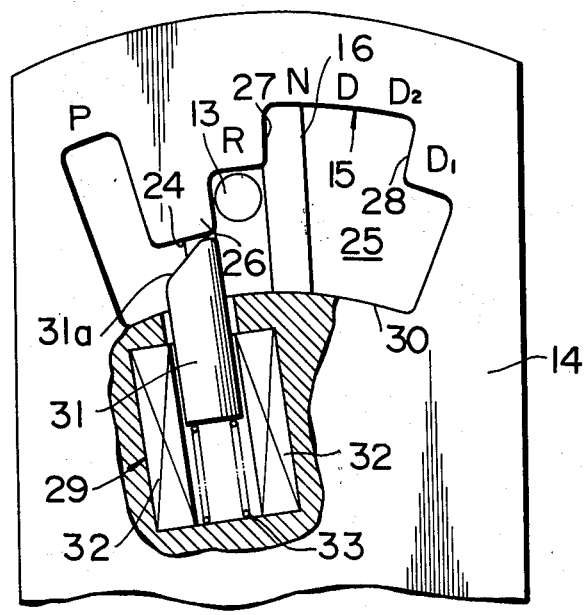
FIG. 3 is an enlarged elevational view, partly in section, of a position plate used with a first embodiment of the shift lever control device for an automatic transmission according to the present invention.

To facilitate understanding of the present invention, a brief reference will be made to a representative prior-art gear shift lever device for an automatic transmission, with reference to FIGS. 1 and 2.

In these figures, the reference numeral 1 denotes a vehicle body, the numeral 2 denotes a shift lever axle rotatably supported on the vehicle body 1 by a bolt 3, to which a shift lever 4 is attached. Into this shift lever 4, a rod 5 having a slope on top is inserted so as to be movable. The reference numeral 7 denotes a knob fixed to the shift lever 4. The knob 7 is provided with a bore 8 extending horizontally in FIG. 2 and a plunger button 9 is slidably inserted into this bore 8. The plunger button 9 is provided with an engagement portion 10 which can be brought into contact with the slope 6. The reference numeral 11 denotes a compression spring in the bore 8 for urging the plunger button 9 toward the right in FIG. 2. Another compression spring 12 is housed within the shift lever 4 so as to urge the rod 5 upward. The reference numeral 13 denotes a pin disposed at the lower portion of the rod 5 which via the compression spring 12 is brought into contact with a cutout 15 formed in a position plate 14 fixed to the vehicle body 1. The cutout 15 is formed with a plurality of arc surfaces centered on the axle 2, corresponding to the respective gearing positions of the automatic transmission such as Park (P), Reverse (R), Neutral (N), Drive (D), Drive 2 ($D_2$) and Drive 1 ($D_1$). A stepped portion 28 is formed between the Drive 2 position ($D_2$) and the Drive 1 position ($D_1$) in the cutout 15, a stepped portion 27 is formed between the Neutral position (N) and the Reverse position (R), and a separating surface 24 is formed between the Reverse position (R) and the Park position (P). When the pin 13 is in contact with any one of these positions (P), (R), (N), (D), ($D_2$) and ($D_1$), the automatic transmission is geared to the transmission mode corresponding to this position. The reference numeral 16 denotes an angle bracket for attaching the shift lever 4 to the axle 2.

In the prior-art shift lever device for an automatic transmission, however, since only a projection 26 having the separating surface 24 at the end thereof is provided between the Reverse position (R) and the Park position (P) in the cutout 15, it is easily possible for the driver to shift the pin 13 to the separating surface 24, thinking that the transmission is now in Park. In this case, the pin 13 can be easily dislodged from the separating surface 24 to the Reverse position (R) by the shock resulting from, for example, closing the door, thus allowing the vehicle to move backwards against the driver's will.

In view of the above description, now follows a description of the present invention with reference to the attached drawings.

FIGS. 3, 4, 5A and 5B show a first embodiment according to the present invention.

First, the structure according to the present invention will be described. The reference numeral 31 denotes a plunger member disposed in the position plate 14 in a position opposite the separating surface 24. The plunger member 31 is attracted by an electromagnetic mechanism 29. On top of the plunger member 31 a slope 31a facing the Park position (P) is formed. When the pin 13 is on the separating surface 24, this slope 31a serves to force the pin 13 toward the Park position (P), thus preventing the pin 13 from remaining in an intermediate shift position, or the so-called pseudo-park position. A spring 33 of less force than the electromagnetic mechanism 29 urges the plunger member 31 toward the separating surface 24. Downward force on the plunger member 31 is relieved when a coil 32 for the electromagnetic mechanism 29 is deenergized, so that the projection member 31 can separate the Park position (P) and the Reverse position (R) via the force of the spring 33.

Figure 4:
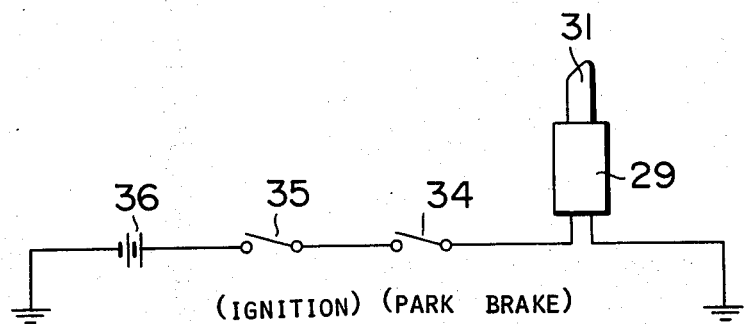
FIG. 4 is a schematic wiring diagram of the first embodiment of the shift lever control device for an automatic transmission according to the present invention, in which an electromagnet is connected to a park brake switch and an ignition switch.

As shown in FIG. 4, the electromagnetic mechanism 29 is connected in series with a first switch 34 and is turned on only when both a parking brake (not shown) is in operation and a second switch 35 is turned on only when an ignition key switch is on. Therefore, the electromagnetic mechanism is energized to attract the plunger member 31 downward only while both the first and second switches 34 and 35 are on. Thus, the shift lever is permitted to be shifted from the Reverse (R) position to the Park (P) position only while a parking brake is operated (switch 34) and after the engine has started (switch 35). The reference numeral 36 denotes a power supply for the electromagnetic mechanism 29, one end of which is grounded and the other end of which is connected to the electromagnetic mechanism 29 via the first and second switches 35 and 34. The other end of the electromagnetic mechanism 29 is also grounded. The shift lever control device 25 is made up of the shift lever 4 (FIGS. 1 and 2), the pin 13, the position plate 14, the plunger member 31 and the electromagnetic mechanism 29.

Now follows a description of operation of the first embodiment according to the present invention.

The automatic transmission illustrated with the first embodiment of the present invention includes five transmission modes (Select positions): Park mode (non-travelling mode), Neutral, and Reverse, Drive, Drive 2, Drive 1 (travelling mode). The selection of one of these transmission modes can be achieved by shifting the shift lever 4 (in FIG. 1) about the axle 2. The travel of the shift lever 4 is restricted by the pin 13 which moves along the cutout 15 in conjunction with the movement of the shift lever 4. The pin 13 is usually in contact with the cutout surface 15 due to the force of the compression spring 12; however, when the plunger button 9 (in FIG. 1) is depressed, since the pin 13 is moved downward in FIG. 3, the pin 13 can move over the stepped portions 27 and 28 and the projection portion 26.

When the vehicle provided with this shift lever control device for an automatic transmission is stopped and the driver applies the parking brake with the ignition key switch kept turned on, the first and second switches 34 and 35 are both turned on and the electromagnetic mechanism 29 is energized to attract the plunger member 31 downward against the elastic force of the spring 33 below the surface 30 in the cutout 15. Therefore, the pin 13 can be shifted from the Part position (P) to the Reverse position (R) or vice versa, freely, by the shift lever 4 in the same way as in the conventional shift lever device for an automatic transmission. In other words, it is possible to freely select the Part position or the Reverse position, when both the switches 34 and 35 are turned on.

Next, in the case where the parking brake is not in operation, since the first switch 34 is therefore off, no current is passed through the electromagnetic mechanism 29 from the power supply 36, so that the electromagnetic mechanism 29 is deenergized. Accordingly, the plunger member 31 is urged by the elastic force of the spring 33 into contact with the separating surface 24. Therefore, it is impossible to shift the shift lever 4 from the Reverse position (R) to the Park position (P), or vice versa.

Figure 5A:
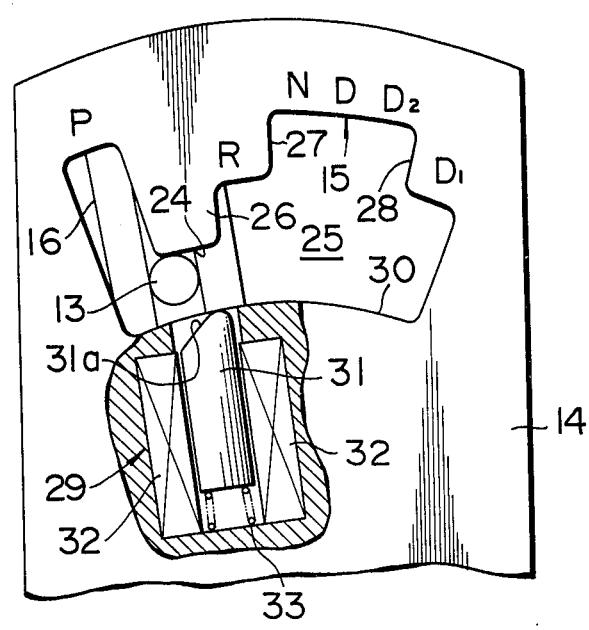
FIG. 5A is an enlarged elevational view, partly in section, of a position plate used with the first embodiment of the shift lever control device for an automotive transmission according to the present invention, for assistance in explaining the operation thereof.
Figure 5B:
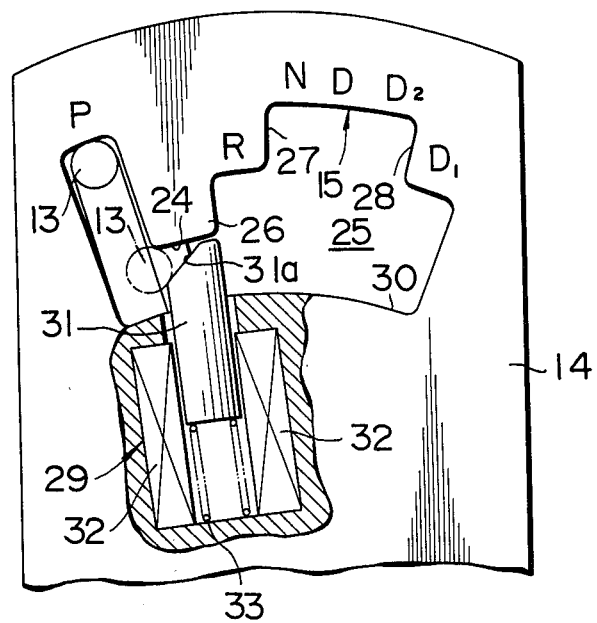
FIG. 5B is a similar enlarged elevational view, partly in section, of a position plate used with the first embodiment of the shift lever control device for an automotive transmission according to the present invention, for assistance in explaining the operation thereof.

On the other hand, in the case when the operation lever 4 is shifted imperfectly into the Park position, that is, when the pin 13 is on the separating surface 24 as shown in FIG. 5(A), and the ignition key is turned off and therefore the second switch 35 linked with the ignition key is also turned off, the electromagnetic mechanism 29 is deenergized because the power supply 36 is turned off. Therefore, the plunger member 31 is urged toward the separating surface 24 by the elastic force of the spring 33. Therefore, as shown in FIG. 5B, the slope 31a formed on top of the plunger member 31 pushes the pin 13 toward Park position (P), so that the pin 13 is brought into engagement with the Park position (P). By this operation, the automatic transmission is securely shifted to the Park position. In other words, it is possible to effectively prevent the pin 13 from slipping from the pseudo-park position (on the separating surface 24) to the Reverse position (R).

Figure 6:
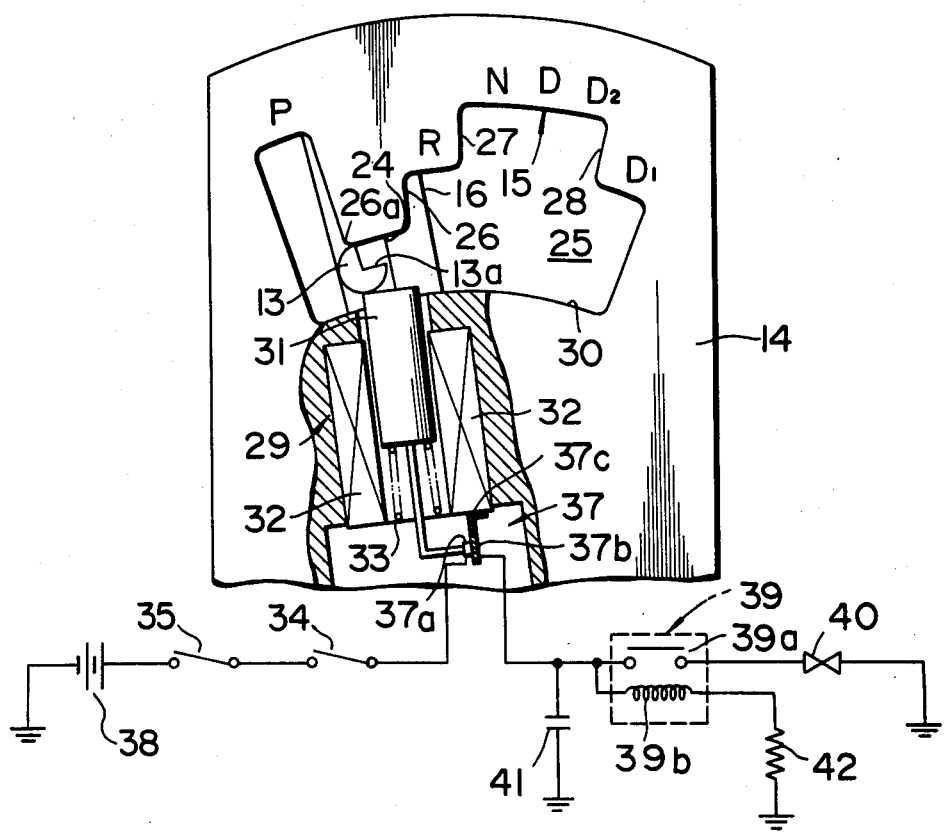
FIG. 6 is an enlarged elevational view, partly in section of a position plate used with the second embodiment of the shift lever control device for an automotive transmission according to the present invention, including a schematic wiring diagram used therefore, in which an alarm generating means is additionally provided thereto.

FIG. 6 shows a second embodiment according to the present invention. In this embodiment, there is provided an alarm generating means 40 which can generate an alarm sound indicating the pseudo-park state when the pin 13 is sandwiched between the separating surface and the plunger member, in addition to the first embodiment according to the present invention.

First, the structure of the second embodiment according to the present invention will be described. The reference numeral 37 denotes a position detection switch for detecting the pseudo-park state of the plunger member 31, which comprises a movable contact 37a movable with the plunger member 31 and a fixed contact 37b fixed to the position plate 14. The movable contact 37a is grounded via a power supply 38, through the series connection of switches 34 and 35 connected as shown in FIG. 5 and operating as there described.

Part of the fixed contact 37b is connected to a parallel circuit of two legs, one consisting in series of a normally-open contact 39a of a relay 39 and the alarm generating means 40, and the other consisting in series of a coil 39b of the relay 39 and a resistor 42. The reference numeral 41 denotes a condenser connected between the fixed contact 37b and the ground in order to provide a brief time delay to prevent the alarm generating means 40 from generating an alarm when the movable and fixed contacts are brought into contact with each other for a short period of time while the plunger member is being attracted or released by the magnet.

The fixed contact is fixed to a non-conductive bracket 37c. The bracket 37c opposes the moving contact 37a when the plunger 31 is in contact with the separating surface 24.

Further, in this embodiment, the upper-right quarter of the circular cross-section of the pin 13 is removed to form a cutout portion 13a. This cutout portion 13a is formed so as to engage with a Park position side corner portion 26a of the projection 26 when the pin 13 is at the pseudo-park position; that is, the pin 13 is held between Park position and Reverse position, so that it cannot be shifted to the Reverse position (R). Therefore, it is possible to prevent the vehicle from travelling rearward even if the transmission lever is shifted to the pseudo-park position due to an imperfect shift position or separating surface.

Figure 7:
FIG. 7 is a front section view of another pin formed into another shape, which is used for the shift lever control device for an automatic transmission according to the present invention.

Furthermore, as shown in FIG. 7, it is also possible to use a square (in cross-section) pin 13 with an upper-right quarter cutout portion 13a so as to engage with the Park position side corner 26a of the projection 26.

In this shift lever control device, in the case when the pin 13 is sandwiched between the separating surface 24 and the top of the plunger 31, that is, when the plunger member 31 does not project fully toward the separating surface 24 of the cutout 15, since the position detection switch 37 is turned on, current passes from the power supply 38 to the coil 39b of the relay 39 to energize the coil 39b. Therefore, the normally-open contact 39a of the relay 39 is closed, so that current passes from the power supply 38, through the position detection switch 37, to the alarm generating means 40, and thus an alarm sound is produced. On the other hand, in the case when plunger member 31 is fully retracted or extended, since the position detection switch 37 is off, the alarm generating means 14 does not operate.

Although the position detection switch 37 is momentarily turned on when the projection member 31 moves from the fully retracted position to the fully extended position under normal circumstances, the alarm generating means will not operate, due to the condenser 41.

Furthermore, in the above-mentioned embodiment, the plunger member 31 engages with the pin 13 between the Reverse position (R) and Park position (P); however, not being limited to the above-mentioned engagement, it is possible to design the shift lever control device for an automatic transmission according to the present invention in such a way that the plunger member 31 may directly engage with the shift lever 4.

As described above, in the shift lever control device for an automatic transmission according to the present invention, since the shift lever control means acts to enable shifting between the Reverse position and the Park position only while the ignition switch is on and the parking brake is in operation, it is possible to eliminate a pseudo-park position, that is, the position between the Park position and the Reverse position, and to prevent the shift lever from being shifted to the Park position by mistake while the vehicle is travelling.

Further, in the embodiment shown in FIGS. 3, 4, 5A and 5B, in addition to the above-mentioned effects, since there is a slope formed on one end of the plunger member facing the Park position, when the shift lever is stopped at the pseudo-park position, that is, when the shift lever is positioned between the Park position and the Reverse position, the pin is forcedly pushed toward the Park position side immediately after the ignition key is turned off, so that the automatic transmission can be fully engaged in park position, thus preventing the possibility that the vehicle will move without the driver's knowledge.

Further, in the embodiment shown in FIG. 6, in addition to the above-mentioned effects, since there is provided an alarm generating means which produces an alarm sound when the shift lever is in pseudo-park position with the pin contacting the separating surface, the driver can readily recognize when the shift lever is shifted to an unsafe position.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A shift lever control device for an automotive transmission fixed on a vehicle body on which an engine and a park brake mechanism are also mounted, which comprises:
   (a) a position plate fixedly attached to the vehicle body having a plurality of cutout surfaces formed therein, each corresponding to one of a plurality of shift positions including Park and Reverse;
   (b) a shift lever rotatably supported on the vehicle body and selectively shiftable to any of the shift positions;
   (c) a pin supported in said shift lever, said pin being movable in the axial direction of said shift lever and brought into contact with the corresponding cutout surface formed in said position plate when said shift lever is shifted to one of said shift positions;

(d) an ignition key switch closed when the engine is running;

(e) a park brake switch closed when the park brake mechanism is in operation;

(f) a plunger member supported at a position between the cutout surface corresponding to the Park position and the cutout surface corresponding to the Reverse position, said plunger member being movable substantially perpendicular to the direction of travel of said shift lever; and (g) an electromagnet mechanism connected in series with said ignition key switch and said park brake switch, said electromagnetic mechanism being energized to retract said plunger member in order to permit said shift lever to be shifted from Park position to Reverse position or vice versa when said ignition key switch and said park brake switch are both closed and being de-energized to release said plunger member in order to prevent said shift lever from being shifted between Park position and Reverse position when either of said ignition key switch or said park brake switch is opened.

2. A shift lever control device for an automotive transmission as set forth in claim 1, wherein said plunger member is provided with a sloped surface which is brought into contact with said pin, facing in such a direction that the slope urges said pin toward the Park position when said plunger member is released.

3. A shift lever control device for an automotive vehicle as set forth in claim 1, which further comprises:

(a) a movable contact fixed to said plunger member, said movable contact moving integrally with said plunger member;

(b) a fixed contact fixed to said electromagnetic mechanism, said fixed contact being brought into contact with said movable contact when said plunger member is not in either its fully-released position or its fully-retracted position; and (c) an alarm device connected in series with said movable and fixed contacts for generating an alarm when said movable and fixed contacts are brought into contact with each other.

4. A shift lever control device for an automotive transmission as set forth in claim 3, which further comprises:

(a) a condenser connected between said fixed contact and ground to prevent said alarm device from generating an alarm when said movable and fixed contacts are brought into contact with each other for a short period of time while said plunger member is moving between its fully-released and fully-retracted positions; and (b) a resistor connected in parallel with said condenser for discharging the electric charge stored in said condenser.

5. A shift lever control device for an automotive transmission as set forth in claim 3, wherein the cross-section of said pin is in the form of a circle having one quarter removed.

6. A shift lever control device for an automotive transmission as set forth in claim 3, wherein the cross-section of said pin is in the form of a square having one quarter removed.

* * * * *